United States Patent [19]

Chandler

[11] 4,254,888

[45] Mar. 10, 1981

[54] LOCKING GAS TANK CAP

[76] Inventor: James D. Chandler, 301 Ridgeview Dr., Wayzata, Minn. 55391

[21] Appl. No.: 66,309

[22] Filed: Aug. 13, 1979

[51] Int. Cl.$^3$ .................. B65D 25/00; B65D 54/14; B65D 43/16
[52] U.S. Cl. ............................ 220/85 P; 220/210; 220/259; 220/336; 220/DIG. 33; 70/158
[58] Field of Search ............... 220/210, 85 P, 256, 220/259, 319, 336; 70/158

[56] References Cited

U.S. PATENT DOCUMENTS

| | | | |
|---|---|---|---|
| 943,407 | 12/1909 | Heimbuecher | 220/336 |
| 1,948,966 | 2/1934 | Jaeger | 220/85 P |

*Primary Examiner*—George T. Hall
*Attorney, Agent, or Firm*—Kinney, Lange, Braddock, Westman and Fairbairn

[57] ABSTRACT

A locking device for a tank having a spout and a cap attached to the spout, the device including a main body having a first and second hinging portion. The first and second hinging portions are hingedly connected with each other and have corresponding mating surfaces surrounding a depression whereby when the mating surfaces are in contact the depressions form a cavity. The cavity completely encompasses the cap and a portion of the spout including a split ring that is firmly engaging the spout. The split ring being firmly attached to the spout and within the cavity prevents a thief from pulling up on the main body to frictionally engage and twist the cap off by engaging the inside edge of an inwardly extending flange of the main body while the main body is being rotated. The cavity is also tall enough to prevent a thief from pushing down to frictionally engage the cap with the main body. A lock securely holds the first and second hinging portions in a closed position.

9 Claims, 6 Drawing Figures

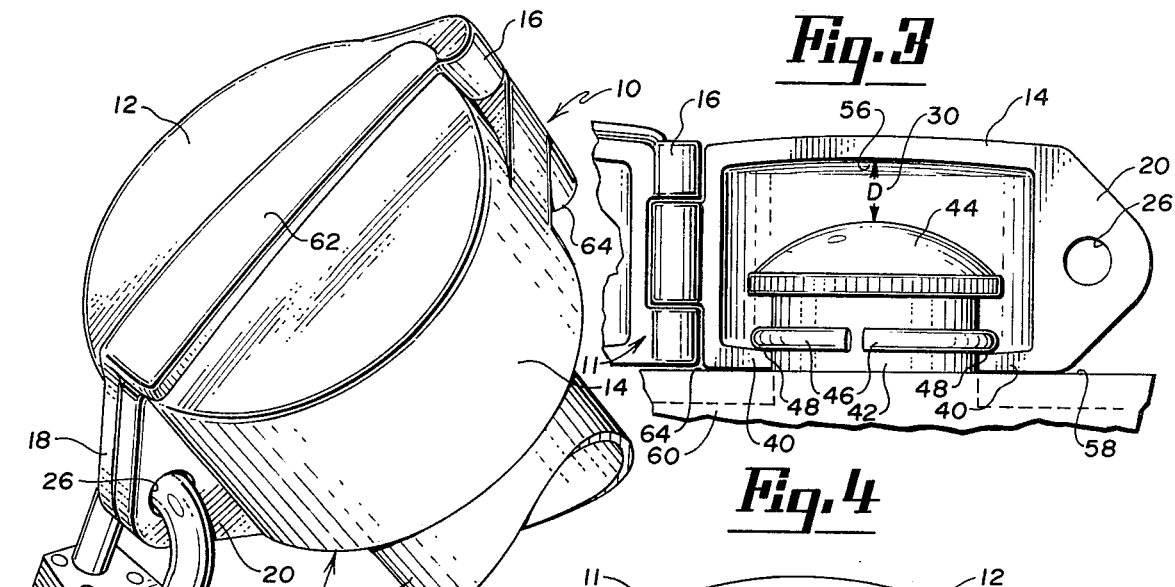
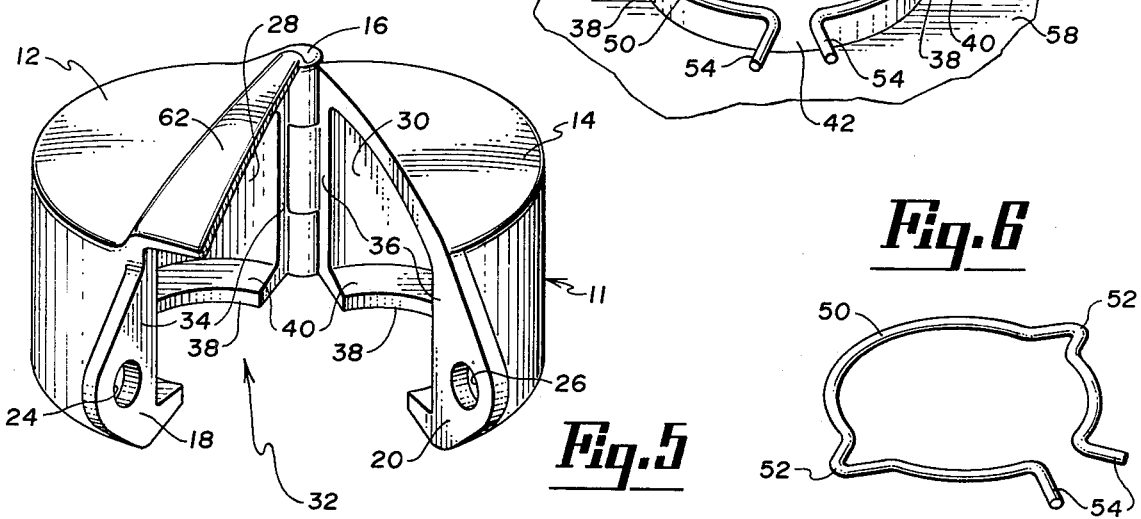
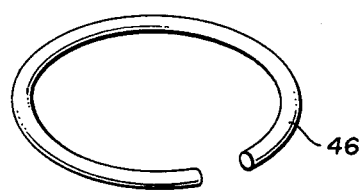

LOCKING GAS TANK CAP

BACKGROUND OF THE INVENTION

1. Field of the Invention

The present invention relates to locking devices that completely encompass a gas cap attached to a spout. In particular, the present invention relates to locking devices that prevent an intruder from frictionally engaging the cap with the locking device to turn the cap to an open position.

2. Description of the Prior Art

As fuel costs increase, pilferage and siphoning fuel from vehicle fuel tanks increases. There are various methods in the prior art that try to stop thieves from siphoning fuel. The vehicle may be placed inside an enclosure or building, but this may not always be possible, as in the case of a semi-tractor on a cross-country run. An anti-siphon ring in the neck of the fuel tank is another method, but this ring can be pushed through by a metal shaft, such as a tire jack handle. A locking gas cap is another method but there is always the difficulty of finding the exact fit for the particular fuel tank spout.

The Mallock U.S. Pat. No. 2,294,922, shows a locking device that completely encompasses the fuel cap. The locking device, however, can be used only with the particular cap, being shaped to conform with the fuel cap, and the fuel cap must exactly fit the particular spout, resulting in the same problem of locking gas caps mentioned previously. Further, the locking device has anti-friction rollers 19 and a spring spider 18 to prevent frictional engagement of the fuel cap with the locking device, adding an extra cost. In addition to the extra cost, this arrangement has the disadvantage that the anti-friction rollers and spring spider are susceptible to freezing in place during the winter, losing their effectiveness.

3. Summary of the Invention

The present invention includes a locking device that completely encompasses a fuel cap and a portion of a fuel tank spout. The locking device has a main body that includes first and second portions hingedly connected with each other. The portions have corresponding mating surfaces surrounding a depression. When the mating surfaces are in contact the depressions form a cavity that is large enough to completely encompass the cap and a portion of the spout including a ring that is firmly engaging the spout.

A radial inwardly extending flange defines an opening to the cavity which is sufficiently large to accomodate most spout diameters. When a thief tries to pull up on the main body to frictionally engage the fuel cap and turn it to an open position by turning the main body, the flange will engage the ring preventing such engagement.

The cavity is also preferably taller than the exposed portion of the spout, thus preventing a thief from pushing the main body down into frictional engagement with the top of the fuel cap to turn it to open position.

Suitable means are provided for locking the hinged portions together. Thus, the hinging portions may have two lugs integral with the first and second hinging portions, the lugs having apertures which will receive a padlock thereby holding the first and second hinging portions in a closed position.

BRIEF DESCRIPTION OF THE DRAWINGS

FIG. 1 is a perspective view of the present invention;

FIG. 2 is a perspective view of the main body in an open position;

FIG. 3 is a fragmentary front view of one hinging portion engaging a tank spout;

FIG. 4 is a fragmentary perspective view of a hinging portion engaging a fuel spout;

FIG. 5 is a perspective view of the split ring of the present invention; and

FIG. 6 is a perspective view of another embodiment of the split ring of the present invention.

DETAILED DESCRIPTION OF THE PREFERRED EMBODIMENTS

The locking device of the present invention is generally indicated at 10 in FIG. 1. The locking device includes a main body 11 with a first hinging portion 12 and second hinging portion 14 hingedly connected to each other at hinged connection 16. Two lugs 18, 20 integral with the first and second hinging portions have apertures 24, 26 which receive padlock 22 as best shown in FIGS. 1 and 2. Although the preferred embodiment shows a padlock, persons skilled in the art will recognize that any locking device, such as a key-type lock built into the lugs, will hold the first and second hinging portions securely together. The main body 11 may be made of any tough material such as steel or unbreakable plastic.

The first and second hinging portions 12, 14 have depressions 28, 30, respectively, which mate with each other. The depressions 28 and 30 form a cavity 32 of the main body 11 when the first and second hinging portions 12, 14 are pivoted against each other on hinged connection 16. The cavity 32 completely encompasses a fuel tank spout 42 and fuel cap 44.

Depressions 28 and 30 are defined by mating surfaces 34, 36 of the first and second hinging portions 12, 14, respectively. The mating surfaces 34, 36 contact each other when the main body 11 is in a closed position. The mating surfaces 34, 36 also include any portion of the lugs 18, 20 that are adjacent to each other when the main body is in the closed position.

A radial inwardly extending flange 40 defines the bottom of the main body 11 and an opening 38 to the cavity 32. The opening 38 conforms to the spout 42, as best seen in FIGS. 3 and 4. The opening 38 is sufficiently large to accomodate a wide range of different width spouts.

A split ring 46, shown in FIG. 5, firmly engages the spout 42 as best seen in FIG. 3. The split ring 46 is separate from the main body 11, as is clear from the drawing, but will engage the flange 40 at point 48 when a thief tries to lift the main body 11 and frictionally engage the bottom of the gas cap 44 and twist the cap off to obtain access to the fuel, by turning the main body 11.

Another embodiment 50 of the split ring is shown in FIG. 6. This embodiment is substantially circular except for two opposing portions 52 which extend outwardly, each forming a hump. The portions 52 extend outwardly a distance sufficient to center the main body 11 around the spout, as best seen in FIG. 4. The portions 52 are also helpful in engaging flange 40 when the width of the spout is much smaller than the width of the opening 38.

The split ring is of course a smaller width than the spout 42 and made of a resilient material, such as spring steel. The split ring can be spread so as to enable it to be placed over the spout. When the ring is released, it engages spout 42 with sufficient force to prevent any movement along the spout. The ring's firm engagement of the spout prevents the frictional engagement of the fuel cap with the main body 11 as described previously. In the embodiment 50 of FIGS. 4 and 6, the split ring has protruding ends to facilitate expansion and engagement with the spout.

The cavity 32 is preferably sufficiently tall to prevent frictional engagement between the top of gas cap 44 and surface 56 which defines the top of the cavity 38. The flange 40 engages surface 58, which is typically a sheet metal surface covering a fuel tank 60, thereby leaving a distance D between gas cap 44 and surface 56, as shown in FIG. 3. As can be seen the smaller the spout protrusion, the larger D is. However, the cavity 32 of the present invention is even tall enough to accomodate tank spouts that do not have any sheet metal covers, such as the side tanks on semi-trucks, and still have a distance D between the top of the gas cap 44 and the surface 56, preventing any frictional engagement.

The first hinging portion 12 has an overlapping edge 62 that overlaps second hinging portion 14. The overlapping portion 62 discourages thieves from trying to pry the first and second hinging portions apart.

The hinging portion 16 which hingedly connects the first and second hinging portion 12, 14 is held together by a pin (not shown). The pin is inserted at the bottom end 64 of the hinged connection 16 and does not extend to the top surface of the hinged connection, remaining hidden from view. This prevents a thief from locating the pin and pushing it out of the hinged connection 16 and pulling the first and second hinging portions apart.

While the device of the present invention has been primarily designed for trucks, it is also applicable to passenger cars. Where it is used with trucks, it may be used only when the truck is parked and removed when the truck is being driven.

Although the present invention has been described with reference to preferred embodiments, persons skilled in the art will recognize that changes may be made in form and detail without departing from the spirit and scope of the invention.

What is claimed is:

1. A locking device in combination with a tank, having a spout and a cap detachably secured to the spout and removable by twisting the same, the device comprising:
   a ring means at least partially surrounding and firmly engaging the spout;
   a main body having first and second hinging portions hingedly connected with each other, said hinging portions having corresponding mating surfaces surrounding a depression whereby when the mating surfaces are in contact, the depressions form a cavity having an opening, said cavity being large enough to completely encompass the cap and the ring means secured to the spout, said hinging portions having radial inwardly extending flanges defining the opening to the cavity, said main body being free of said ring means but engaging the same when upward pressure is applied to the main body to prevent twisting of said cap by frictional engagement of the main body with the cap, and
   a locking means for securely holding the first and second hinging portions in a closed position that completely encompasses the cap and the ring means attached to the spout.

2. The device of claim 1 wherein the first hinging portion further includes an overlapping section that is adjacent to the top of the second hinging portion when in a closed position.

3. The device of claim 1 wherein the first and second hinging portions have first and second lugs respectively attached thereto with padlock receiving apertures.

4. The device of claim 3 further including a padlock means having a shackle extending through the apertures of the first and second lugs and holding the portions together.

5. The device of claim 1 wherein the ring means is a circular split ring.

6. The device of claim 1 wherein the ring means is a split ring substantially circular except for two opposing portions that extend outwardly a sufficient distance to center the cavity of the main body with respect to the spout.

7. The locking device of claim 1 wherein the main body is made of a plastic material.

8. The locking device of claim 1 wherein the main body is made of steel.

9. The device of claim 1 wherein the cavity formed by the first and second hinging portions is sufficiently tall to prevent frictional engagement between the fuel cap and a top surface of the cavity.

* * * * *